US012020581B2

United States Patent
Lohmiller et al.

(10) Patent No.: US 12,020,581 B2
(45) Date of Patent: Jun. 25, 2024

(54) METHOD FOR OPERATING AN AT LEAST TEMPORARILY UNMANNED AIRCRAFT AND SUCH AN AIRCRAFT

(71) Applicant: Airbus Defence and Space GmbH, Taufkirchen (DE)

(72) Inventors: Winfried Lohmiller, Taufkirchen (DE); Jörg Meyer, Taufkirchen (DE); Thomas Heuer, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 294 days.

(21) Appl. No.: 16/668,164

(22) Filed: Oct. 30, 2019

(65) Prior Publication Data
US 2020/0184834 A1 Jun. 11, 2020

(30) Foreign Application Priority Data
Oct. 31, 2018 (DE) ...................... 10 2018 218 715.0

(51) Int. Cl.
G08G 5/04 (2006.01)
G08G 5/00 (2006.01)
B64C 39/02 (2023.01)

(52) U.S. Cl.
CPC ........... *G08G 5/0069* (2013.01); *G08G 5/045* (2013.01); *B64C 39/024* (2013.01); *B64U 2201/104* (2023.01)

(58) Field of Classification Search
CPC .... G08G 5/0069; G08G 5/045; B64C 39/024; B64C 2201/145
See application file for complete search history.

(56) References Cited

U.S. PATENT DOCUMENTS

2007/0129855 A1 6/2007 Coulmeau
2009/0027253 A1 1/2009 van Tooren et al.
(Continued)

FOREIGN PATENT DOCUMENTS

DE 102007032084 A1 1/2009
DE 102015004854 A1 10/2016
(Continued)

OTHER PUBLICATIONS

Anonymous, "Introduction to TCAS 11, Version 7.1" This booklet provides the background for a better understanding of the Traffic Alert and Collision Avoidance System (TCAS II), U.S. Department of Transportation, Federal Aviation Administration, Feb. 2011, pp. 1-50.

*Primary Examiner* — Peter D Nolan
*Assistant Examiner* — Roy Rhee
(74) *Attorney, Agent, or Firm* — Lerner David LLP

(57) ABSTRACT

A method for operating an at least temporarily unmanned aircraft, wherein a flight is performed according to a prior flight plan in an airspace controlled by a control instance. A flight direction is determined during the flight via a control device influenced via a data connection by a control instance. The data connection is temporarily unavailable, and a hazardous or emergency situation requiring deviation from the flight plan, is identified by the control device based on first sensor data. An avoidance route is determined by the control device based on a second sensor data, the avoidance route including a avoidance manoeuvre avoiding the hazardous or emergency situation, the avoidance route is used in the meantime to fly towards a destination area with the least possible volume of air traffic; and the necessary avoidance manoeuvre(s) are performed based on the second data by the control device in an autonomous staggering procedure.

12 Claims, 3 Drawing Sheets

(56) References Cited

U.S. PATENT DOCUMENTS

| | | | | |
|---|---|---|---|---|
| 2012/0203450 A1* | 8/2012 | Meyer | ............... | G08G 5/045 |
| | | | | 701/301 |
| 2016/0232795 A1* | 8/2016 | Thiele | ............... | G05D 1/0022 |
| 2018/0279105 A1* | 9/2018 | Huber | ............... | H04W 48/12 |

FOREIGN PATENT DOCUMENTS

| | | | |
|---|---|---|---|
| EP | 2853974 A1 | 4/2015 | |
| EP | 3267424 A1 | 1/2018 | |

\* cited by examiner

METHOD FOR OPERATING AN AT LEAST TEMPORARILY UNMANNED AIRCRAFT AND SUCH AN AIRCRAFT

FIELD OF THE INVENTION

The invention relates to a method for operating an at least temporarily unmanned aircraft, wherein a flight procedure of the aircraft is performed in accordance with a previously-authorized flight plan in an airspace that is controlled by at least one control station, wherein a flight direction of the aircraft is determined during the flight procedure via a control device that may be influenced via at least one data connection by means of a control instance, wherein the data connection is at least temporarily unavailable during the flight procedure, and wherein a hazardous situation and/or emergency situation, which renders it necessary to deviate from the authorized flight plan, is identified by means of the control device with the aid of first data of at least one first sensor.

Moreover, the invention relates to an at least temporarily unmanned aircraft, which flies through a controlled airspace according to a previously-authorized flight plan, in which a data connection, via which the aircraft may be controlled or is controlled, is at least temporarily unavailable when flying through the airspace and which identifies with the aid of first data of a first sensor a hazardous situation and/or emergency situation, which renders it necessary to deviate from the authorized flight plan.

In conditions in which the data connection between the pilot, who is controlling the aircraft remotely, and the aircraft itself is lost, the at least temporarily unmanned aircraft that is operated in controlled airspace in other words identifies the necessity to deviate from the previously-authorized flight route, by way of example so as to circumvent severe weather conditions, in the case of damage to the motor, system failure, hail, scarcity of fuel or other circumstances of this type without claiming this list is comprehensive. In this case the situation arises in which poor weather is to be flown around, naturally this is not an emergency situation but rather only a potential hazard that may be avoided by means of a change of flight plan.

BACKGROUND OF THE INVENTION

Unmanned aircraft (below this term is used synonymously with the abbreviations RPAS (remotely piloted aircraft system), UAV (unmanned aerial vehicle) or UAS (unmanned aerial system)) are increasingly used for transporting loads, for surveillance tasks or reconnaissance tasks or also military tasks, such a possibility is also seen by many as the future for passenger transportation. However, an aircraft may also be controlled by one or multiple pilots who however for different reasons may in any case be unavailable for a specific period of time which is why the wording "at least temporarily unmanned" has been selected. Conceptually of course "unmanned" means only a cockpit crew, independent of this people may be or also may not be on board the aircraft and their presence or absence however does not influence the control of the UAV.

In this case, the relevant aircraft generally flies according to a flight plan through an airspace that is monitored by ground-based control stations of air traffic control (ATC) that communicate with one another, said flight plan to be submitted and to be authorized prior to the flight procedure. The only actual difference between an unmanned flight procedure and a manned flight procedure may in this case be seen as the fact that a pilot (called PIC pilot in command or PIL pilot in the loop and in particular also RP for remote pilot) who is responsible for flying movements and their amendments during arbitrary control is not simultaneously present in the aircraft but rather provides control commands at another site, a so-called RPS (remote pilot station) and (simultaneously) monitors systems of the aircraft. The ATC in turn is responsible for supporting the remote pilot by means of providing information, organizing and handling the traffic flow that is caused by means of the aircraft that are located in the airspace and in this case avoiding collisions by means of staggering the aircraft.

The capability or possibility of influencing the behaviour of the unmanned aircraft during the flight is provided by means of a data connection system that establishes different control capabilities and communications capabilities. This data link that is also called C2 (command and control)-link may also be realized via an LOS (line of sight) connection or a BLOS (beyond line of sight, in other words satellite) connection, which naturally is afflicted with a specific probability of failure. In a manned aircraft, the pilot would select an alternative route in a hazardous situation or emergency situation and initiate and call the air traffic control in order to receive authorization for a deviation from the original flight plan. Since this is not directly possible during a loss of a C2 connection for the at least temporarily unmanned aircraft or spacecraft, in such states in accordance with the invention the aircraft will determine a specific path in order to deviate from the authorized flight plan.

The RP may control the flight of the at least temporarily unmanned aircraft via the mentioned data link by way of example by means of actuating components of the flight control, the drive system or the landing gear, may monitor and control the hazard avoidance system (D and A, DAA, detect and avoid) of the aircraft and by way of example may support functions such as a so-called "handover" between control stations of the air traffic control or multiple so-called remote pilot stations (RPS) during the flight procedure or the recording of flight data.

Furthermore, flight parameters and warnings without claiming this list is comprehensive by way of example of actuators, avionics inter alia having navigation system(s), sensors and communications systems, climate system, engine, structure, weather radar of the control device as the flight control system of the RPAS may be monitored and may be transmitted to the pilots that are not present. Finally, it is also possible in this case to use the at least temporarily unmanned aircraft as a so-called relay for a further aircraft or also another at least temporarily unmanned vehicle on the ground.

The functions of the voice transmission and/or data transmission between the aircraft and the pilot, a control centre or other pilots are provided by means of the data connection. Such functions by way of example when multiple RPAS are connected for example are provided by means of commercial telecommunications network providers that provide the data link, wherein here the quality of the connection itself and the service (QoS) may vary considerably. If a sight connection does not exist between a data transmission station and the aircraft, satellite connections are used for transmission where applicable.

In order to exchange data between aircraft and the air traffic control ATC, the control device of the RPAS may autonomously establish a data radio connection as a VDL—data radio connection, in particular as a so-called Mode2 connection that is also named CPDLC (controller pilot data link communication). VDL (VHF data link) is a method for exchanging data between aircraft and ground stations. Mode2 is a widespread communications standard, the communication would also function with Mode3 with multiple channels or the further development Mode4.

A temporary failure of the data connection between RP and RPAS at any time is already in principle not to be at least entirely ruled out which is why this situation may also then obviously arise if a hazardous situation and/or emergency situation, which renders it necessary to deviate from the authorized flight plan, is identified by means of the control device with the aid of first data of at least one first sensor. In this case, it initially remains to be seen which type of sensor(s) "trigger(s)" the relevant hazardous situation and/or emergency situation. It should be noted by way of example both in flight control systems and management systems for example an ECAM system (electronic centralized aircraft monitoring) that monitors the engines, at a weather radar or also a risk avoidance system or a collision warning system such as by way of example an ACAS (airborne collision avoidance system) that is possible in various implementations such as by way of example TCAS II (traffic alert and collision avoidance system) that the warnings of said systems could render it necessary to change the flight trajectory where applicable.

BRIEF SUMMARY OF THE INVENTION

Aspects of the present invention may provide a method that renders it possible for an at least temporarily unmanned aircraft to be able to autonomously deal with specific hazardous situations and/or emergency situations.

A solution accordingly resides in particular in the fact that an avoidance route of the aircraft is determined by a control device of the aircraft with the aid of second data of at least one second sensor, said avoidance route comprising one or multiple avoidance manoeuvres that avoid the hazardous situation and/or emergency situation, wherein the avoidance route that is to be determined flies towards a destination area that is affected by the least possible volume of air traffic; and wherein the necessary avoidance manoeuvre(s) of the avoidance route are performed with the aid of the second data by means of the control device in an autonomous staggering procedure.

In accordance with an aspect of the invention, the aircraft that is cut off from the data connection and therefore from external control commands by means of the PIC performs in other words an autonomous staggering procedure or separation of traffic that is also known as a self-separation procedure and determines by means of the control device of said aircraft with the aid of second data of at least one second sensor an avoidance route that comprises one or multiple avoidance manoeuvres that avoid the hazardous situation and/or emergency situation. In order to subsequently be able to fly along the avoidance route, it goes without saying that an autopilot system is present in the RPAS itself.

In order to be able to operate the mentioned self-separation with reduced outlay and in spite of this be able to ensure a collision-free flight procedure, in this case initially a destination area is flown towards that comprises the least possible volume of air traffic with the result that the avoidance route or the avoidance manoeuvre that represents said avoidance route impairs the surrounding air traffic as little as possible and the risk of collision is minimized in this manner.

In the case of one advantageous embodiment of the method in accordance with the invention, when the aircraft transfers into the autonomous staggering procedure a signal is continuously transmitted by means of the aircraft and other users of the air traffic are informed regarding this circumstance by means of said signal. The air traffic is informed with the aid of the signal that the aircraft is following its course under an emergency regime after transmitting the signal. In this case, it is conceivable to provide the relevant signal with additional information that could where applicable categorize the type of emergency.

In one advantageous variant of the method, the autonomous staggering procedure may take place when the avoidance manoeuvre(s) is/are being performed without prior authorization by means of the at least one control station. Since there is possibly no opportunity for communication between the PiC and the control station of the ATC, it is then no longer necessary to perform the staggering procedure in a method.

In the case of a further advantageous variant of the method, the reduction of potential for collision with other aircraft in the path towards the destination area may be desired as an additional criterion. How individual criteria are weighted when the avoidance route is determined may be a question of the implementation of the emergency regime, wherein the low volume of traffic in the destination area may take preference owing to the autonomous staggering procedure. Further considerations for example with regard to the efficiency of the relevant avoidance route as a whole or individual avoidance manoeuvres could play a role as an additional criterion. These also depend upon the type of the emergency situation and/or hazardous situation and should then be accordingly implemented.

If an autonomous staggering procedure is established once during the emergency regime of the avoidance route, said autonomous staggering procedure is expediently maintained so as to increase the safety when the avoidance manoeuvre(s) is/are performed at least until the data link to the control instance of the control device of the aircraft is restored. Advantageously, this staggering procedure may also be maintained when the data connection is restored, by way of example then if the UAV has to a large extent already flown along the avoidance route and it does not appear expedient to return to the air traffic control-based traffic separation (ATC separation) at the specific point in time.

Another advantageous embodiment of the method may however also be embodied in such a manner that the autonomous staggering procedure is interrupted when the data connection is re-established and the aircraft is guided back to another or the original course.

One advantageous further development of the method in accordance with the invention may relate to the fact that the first data is provided by means of at least one non-cooperative first sensor since this type of sensors is not dependent upon cooperation with other systems or their sensors and in this manner renders it possible to independently transmit data. Non-cooperative sensors are accordingly autonomous with regard to the capture of data and do not rely for this purpose on cooperation with dedicated other sensors or services. Non-cooperative sensors may be active or passive sensors, for example active or passive radio sensors (RADAR), weather radar sensors, electro-optical sensors, laser rangefinders, LIDAR sensors, acoustic sensors or infrared sensors. In principle, it is not necessary for the at least one first sensor to mandatorily be arranged on board the UAV.

Another advantageous further development of the method in accordance with the invention is based on the fact that the second data is determined by means of at least one transponder-based cooperative second sensor. In this case, such sensors that capture data only in cooperation with other sensors are considered as cooperative sensors. In general, said cooperative sensors are transponder-based (for example a TCAS II system, in particular having a mode S or mode C transponder) but may also use other transmissions and squitter messages such as ADS-B (automatic dependent surveillance broadcast; automatic transmission-dependent/ associated monitoring data).

In this case, in a particularly preferred method variant the cooperative second sensor of the aircraft comprises a receiving transponder that is either capable of identifying and processing information of individual other aircraft in its surrounding area or/and receiving such information regarding the entire air traffic from the ATC, where applicable in a further processed manner. In this case, it is possible by way of example for a cooperative sensor of a further aircraft that is located in the immediately surrounding airspace to further develop avoidance routes, said aircraft having the at least one cooperative second sensor of the UAV. Provided that in this case a collision avoidance system is used, avoidance recommendations, in particular also lateral avoidance recommendations, may be generated autonomously by means of said collision avoidance system during the self-separation procedure and said avoidance recommendations may be autonomously coordinated with other users of the airspace.

In the case of a preferred variant of the method, periodic position messages and state messages including absolute horizontal position information are spontaneously transmitted by means of at least one transponder of the second sensor with the result that further users of the airspace in the airspace around which the UAV is flying under the emergency regime are continuously supplied with these messages and information.

In a further preferred variant of the method in accordance with the invention, further developed monitoring environments of the aircraft are used so as to obtain data. Since as opposed to monitoring techniques that are currently used in which for example a ground-based radar transmits interrogating signals and the responses from transponders of the aircraft are used to determine location, in this case by way of example ADS-B capable aircraft transmit their positions of their GNSS navigation system once per second. The information that is received from the control stations of the ATC and other ADS-B aircraft comprises the identification of the aircraft, altitude, speed, speed, speed, projected path and other useful information. Moreover, it is possible in the case of further developed systems to receive ADS-B data from specific ground-based receivers that relay said data directly to the display systems in the closest air traffic control centre. The air traffic control centre in turn is capable of connecting weather data and other data via the transmitter of the ground station to the aircraft. It is also conceivable, that in this case space-based infrastructure is used for transponder signals.

The capability of the transponder of the second cooperative sensor is therefore helpful for the autonomous staggering procedure and perception of the air traffic situation by means of the RPAS or if the data connection is (re)established by the PIC of said RPAS on the one hand to transmit signals regarding the monitoring information to other users of the airspace and the air traffic control, on the other hand to receive and to process signals from surrounding users of the airspace or from the ATC. If the PIC may engage in the UAV in a controlling manner, it is expedient to provide said PIC with a display means which suitably displays the traffic information to said pilot in command.

In the case of a re-established data connection, it is possible where applicable to return to ground-based separation of traffic.

Another expedient method variant dynamically adapts the selected avoidance route by means of the control device to changing data of the at least one second sensor with regard to a potential for collision and/or the avoidance route may be amended according to currently-set criteria. In this case, it is also possible to take into account for example safety targets and operating targets of the aircraft system with the result that the logic may be tailored to the processing of criteria to specific methods or airspace configurations. In this case, this is a type of optimizing procedure in order to determine the best approach depending upon the conflict context. In this case, it is possible for example to also use a rewards system and costs system in order to establish which measures would bring the greatest benefits (in other words a safe separation while simultaneously performing a cost-efficient avoidance manoeuvre). Minimizing the frequency of warnings that lead to reversals/intentional traversing of altitudes of intruders or disruptive notifications in the case of non-critical encounters are associated with the most important indicators for the operational suitability and the acceptance by the RP.

Another aspect of the invention is a temporarily unmanned aircraft of the described type with which the method in accordance with the invention is implemented.

The above embodiments and further developments may be combined, as far as is expedient, with one another in an arbitrary manner. Further possible embodiments, further developments and implementations of the invention also comprise not explicitly mentioned combinations of features of the invention, which are described above or below in relation to the exemplary embodiments. In particular, in this case the person skilled in the art will also add individual aspects as improvements or supplementations to the respective base form of the present invention.

BRIEF DESCRIPTION OF THE DRAWINGS

The invention is further explained below with the aid of exemplary embodiments in the figures of the drawing. In this case, in an in part heavily schematic illustration.

DETAILED DESCRIPTION

Figure 1:
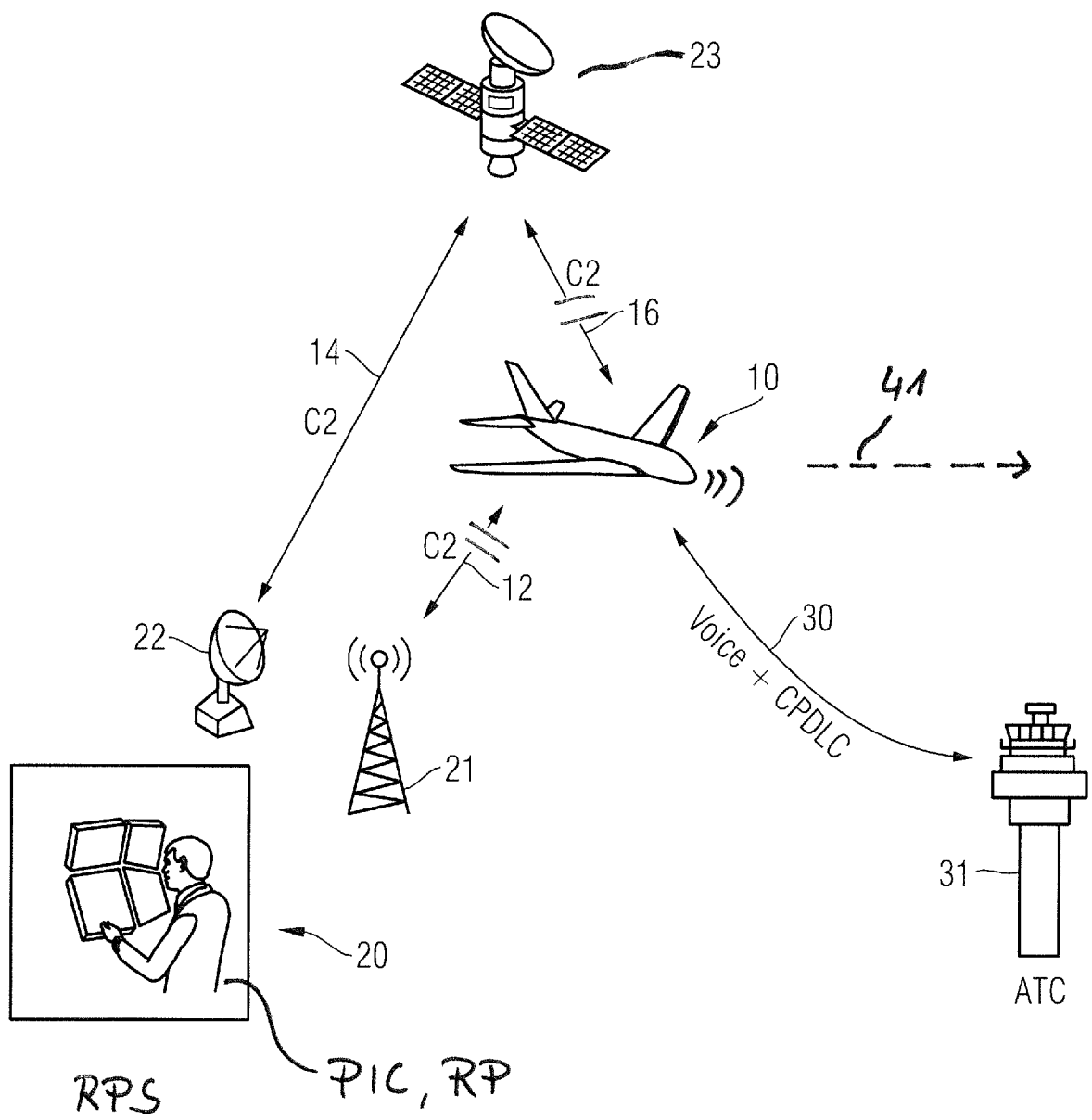
FIG. 1 illustrates a temporarily unmanned RPAS that is controlled by means of a PIC, said RPAS being in voice contact and CPDLC contact with the air traffic control centre via a data connection, however the data connection of said RPAS to the PIC is interrupted.

In this case, FIG. 1 illustrates an at least temporarily unmanned aircraft 10, which is connected to a remote pilot station RPS via various C2 connections 12, 14, 16 in a bidirectional manner, in other words both in the uplink as well as in the downlink with the result that a pilot (PIC) that is present in the remote pilot station 20 may control the aircraft 10.

The different C2 connections 12, 14, 16 in this case illustrate cases that the aircraft or spacecraft may be responsive by means of a C2 connection 12 on the one hand via a sight connection (radio line of sight, RLOS) between a ground exchange 21 and the aircraft or spacecraft 10, on the other hand in the event of a lack of a sight connection (beyond radio line of sight, BRLOS) by means of a combination of a plurality of C2 connections 14, 16 on the one hand between a satellite ground station 22 and a satellite 23 and then between the satellite 23 and the aircraft or spacecraft 10. As long as the delay times in the signal transmission may be kept short, the remote pilot station RPS may also be arranged spaced from the ground exchange sites 21, 22.

In this case, in FIG. 1 the two connections 12, 16 that are otherwise available and lead to the RPAS are illustrated as interrupted in order to illustrate that at the illustrated point in time it is not possible for the RP to influence the control of the RPAS 10.

A telephone connection is not further illustrated in FIG. 1 by means of which the remote pilot station RPS could also communicate as a ground station with the control instance 31 in the event of a failure of the C2 connection. Finally, in FIG. 1 a CPDLC connection 30 is also apparent as a data radio connection between the aircraft 10 and a control instance, the ATC controller 31.

FIG. 1 illustrates the point in time at which in the case of interrupted data connections 12, 16 to the aircraft 10 a hazardous situation and/or emergency situation, which renders it necessary to deviate from the authorized flight plan, is identified by means of the control device that is not further illustrated with the aid of first data of at least one first sensor that is likewise not further illustrated.

The UAV 10 at this point in time begins with transmitting a signal that includes both information with regard to the position data and state data of said UAV, which is obtained from first sensors, as well as information with regard to the emergency state of said UAV. The dashed arrow indicates the plan of a deviation from the original course in the form of a planned avoidance route 41 whilst implementing an autonomous staggering procedure, in other words a self-separation, of the UAV 10. The control device of the UAV 10 determines for this purpose with the aid of second data of at least one second sensor an actual avoidance route 42 of the UAV, said avoidance route comprising one or multiple avoidance manoeuvres that avoid the hazardous situation and/or emergency situation.

Figure 2:
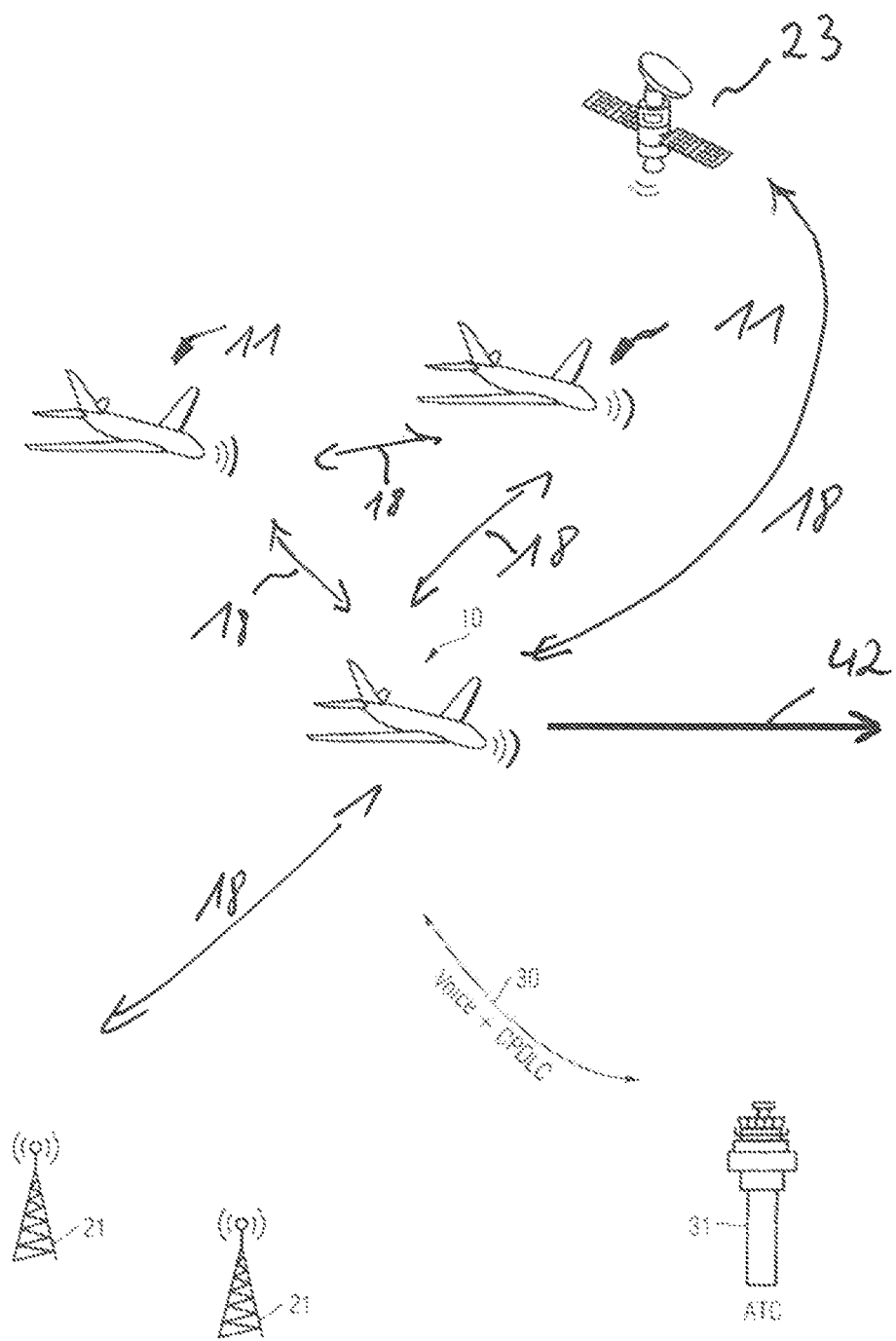
FIG. 2 illustrates an arbitrary airspace that is being flown through by the RPAS in which transponder-based contact occurs with further aircraft.

The relevant avoidance route 42 that is indicated by means of the solid arrow is more apparent in FIG. 2, said avoidance route being used at least in the meantime to fly towards a destination area that is affected by the least possible volume of air traffic. The necessary avoidance manoeuvre(s) of the avoidance route 42 are performed with the aid of the second data by means of the control device in an autonomous staggering procedure, in other words in a self-separation procedure. The UAV 10 moves away in this case from other users of the airspace in the form of aircraft 11 using the avoidance route 42, wherein the UAV 10 and other aircraft 11 communicate with one another via transponder-based cooperative sensors, which is illustrated by means of the transponder-based communication connections of the UAV 10 to other aircraft 11, ground exchange sites 21, a satellite and the air traffic control ATC 31.

Furthermore, it is apparent that the voice connection and/or CPDLC data radio connection to the ATC controller can certainly be provided.

Figure 3:
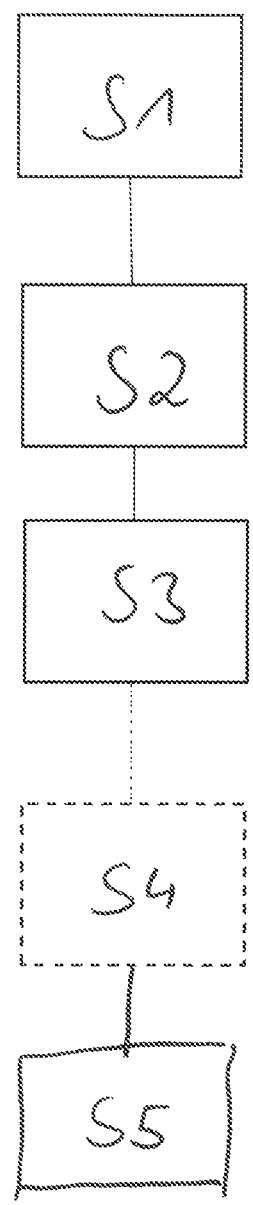
FIG. 3 illustrates schematically the method in accordance with the invention in a flow diagram.

FIG. 3 illustrates in the form of a flow diagram a sequence of a method in accordance with an aspect of the invention. In this case, a step S1 illustrates the identification of a hazardous situation and/or emergency situation by means of the control device of the UAV 10 with the aid of first data of at least one first sensor. In a step S2, the UAV 10 transfers under this emergency regime to an autonomous staggering procedure, the self-separation procedure, and transmits a corresponding signal via at least one of its transponders. In a step S3, the control device determines with the aid of second data of at least one second sensor a planned avoidance route 41, 42 for the UAV, said avoidance route comprising one or multiple avoidance manoeuvres that avoid the hazardous situation and/or emergency situation, wherein said avoidance route 41, 42 that is to be determined is used at least in the meantime to fly towards a destination area that is affected by the least possible volume of air traffic.

In one facultative step S4 in FIG. 3, the selected avoidance route is dynamically adapted by means of the control device to changing data of the at least one second sensor with regard to a potential for collision and the avoidance route is amended according to the implemented and currently-set criteria.

In a step S5 of the variant of the method that is illustrated in FIG. 3, the data connection for the control of the UAV 10 is re-established, the self-separation procedure is interrupted and the aircraft 10 is guided to its destination whilst returning to its original course.

The above-described mechanism is in particular useful in conditions where there is a lack of available time, in other words then if there is not sufficient time available for the RPAS to identify suitable deviations from the flight plan and subsequently to transmit authorization requests to the ATC controller 31 so that said ATC controller may assess these authorization requests and may provide a response via a data radio connection 30, by way of example a CPDLC connection.

Although the present invention has been described above with the aid of preferred exemplary embodiments, said invention is not limited to the exemplary embodiments but rather may be modified in diverse ways. In particular, the invention may be amended or modified in various ways without departing from the core of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Aircraft, RPAS, UAV
11 Other aircraft
12 C2-connection
14 C2-connection
16 C2-connection
18 Transponder-based data connection
20 Remote pilot station RPS
21 Ground exchange site
22 Satellite ground station
23 Satellite
30 VHF data radio connection
31 Control instance, ATC, Air traffic control 41 Planned avoidance route
42 Actual avoidance route
S1-S5 Method steps of the method in accordance with the invention

The invention claimed is:

1. A method for operating an at least temporarily unmanned aircraft, the method comprising:
performing a flight procedure of the aircraft in accordance with a previously-authorized flight plan in an airspace that is controlled by at least one control instance;
determining a flight direction of the aircraft during the flight procedure via a control device that is influenced via at least one data connection by a control instance, wherein the data connection is at least temporarily unavailable during the flight procedure;
identifying a hazardous situation and/or emergency situation, which renders it necessary to deviate from the authorized flight plan, by the control device with the aid of first data consisting of data received from at least one non-cooperative first sensor;
determining an avoidance route of the aircraft by the control device with the aid of second data consisting of data received from at least one transponder-based cooperative second sensor, said avoidance route comprising one or multiple avoidance manoeuvres that avoid the hazardous situation and/or emergency situation;
using the avoidance route at least in the meantime to fly towards a destination area, said destination area being affected by the least possible volume of air traffic; and
performing necessary avoidance manoeuvre(s) of the avoidance route with the aid of the second data by the control device in an autonomous staggering procedure,
wherein a signal is continuously transmitted by the aircraft when said aircraft transfers into the autonomous staggering procedure until the termination of said autonomous staggering procedure and other users of the air traffic are informed regarding the transfer into the autonomous staggering procedure by said signal, and
wherein the signal includes information regarding position data and state data of the aircraft and information regarding an emergency state of the aircraft.

2. The method according to claim 1, wherein the autonomous staggering procedure takes place when the avoidance manoeuvre(s) of the avoidance route is/are performed without prior authorization by the at least one control station.

3. The method according to claim 1, wherein the reduction of potential for collision with other aircraft is desired as an additional criterion when flying to the destination area.

4. The method according to claim 1, wherein the autonomous staggering procedure is maintained when the avoidance manoeuvre(s) is/are performed at least until the data connection to the control instance of the control device of the aircraft is restored.

5. The method according to claim 1, wherein the autonomous staggering procedure is also maintained when the data connection between the control instance and the aircraft is restored.

6. The method according to claim 1, wherein the autonomous staggering procedure is interrupted when the data connection is re-established and the aircraft is guided back to another or the original course.

7. The method according to claim 1, wherein the cooperative second sensor of the aircraft is provided with a transponder configured for receiving and processing transmissions of other sensors.

8. The method according to claim 1, wherein periodic position messages and state messages including absolute horizontal position information are spontaneously transmitted by the at least one transponder of the second sensor.

9. The method according to claim 1, wherein further developed monitoring environments of the aircraft are used by the control device of the aircraft and/or at least one of the sensors so as to obtain data.

10. The method according to claim 1, wherein a display means is allocated to the aircraft, which provides the control instance in the case of external control with an overview of the air traffic information that is available.

11. The method according to claim 1, wherein the selected avoidance route is adapted dynamically by the control device to changing data of the at least one second sensor with regard to a potential for collision and/or the avoidance route is amended according to the currently-set criteria.

12. An at least temporarily unmanned aircraft, which flies through a controlled airspace according to a previously-authorized flight plan, in which a data connection, via which the aircraft may be controlled or is controlled, is at least temporarily unavailable when flying through the airspace for implementing a method according to claim 1.

* * * * *